Figure 9:
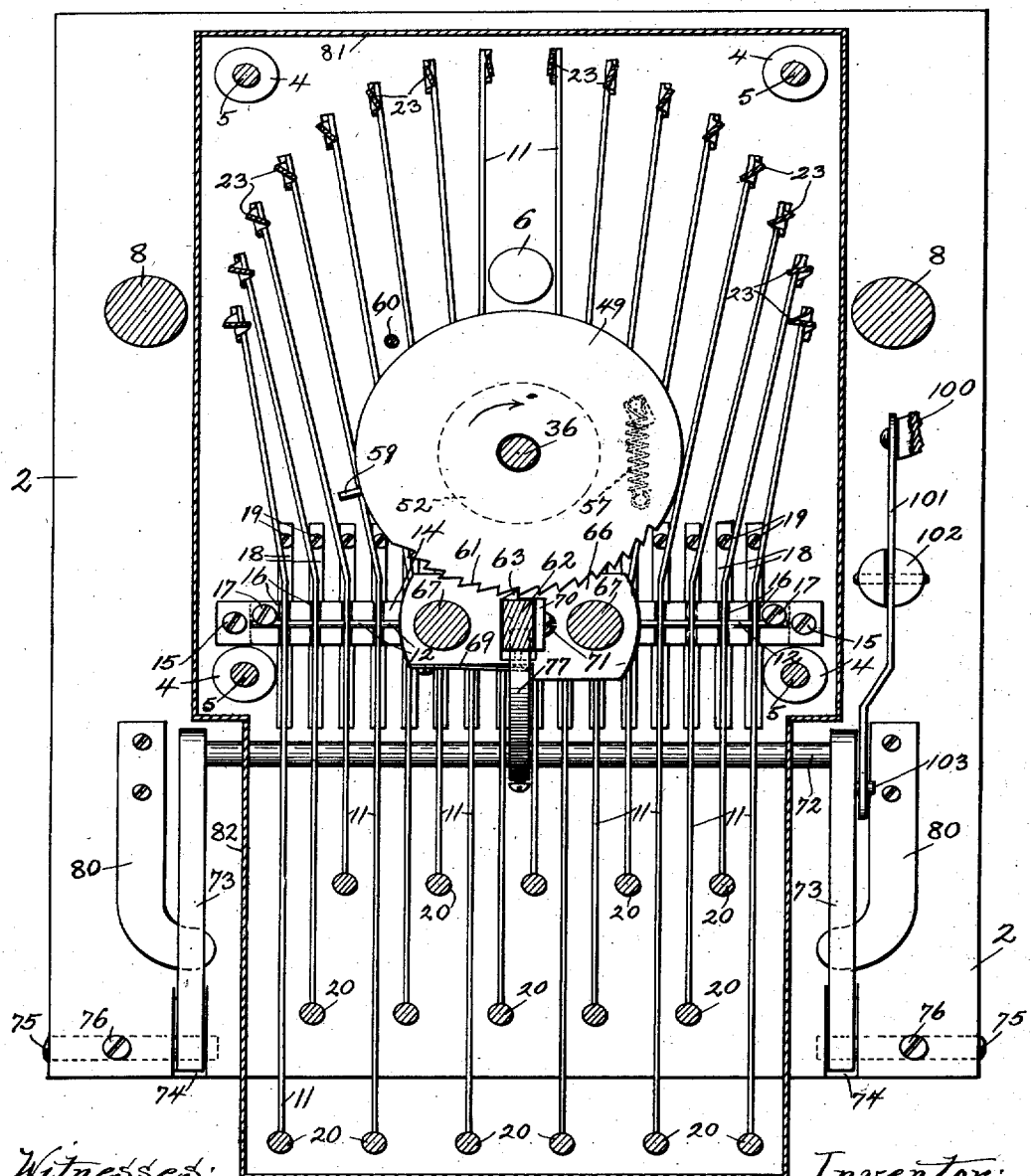

No. 756,649. PATENTED APR. 5, 1904.
W. KAISLING.
MACHINE FOR MARKING TRANSMITTER FRONTS OR THE LIKE.
APPLICATION FILED MAY 1, 1903.
NO MODEL. 6 SHEETS—SHEET 1.
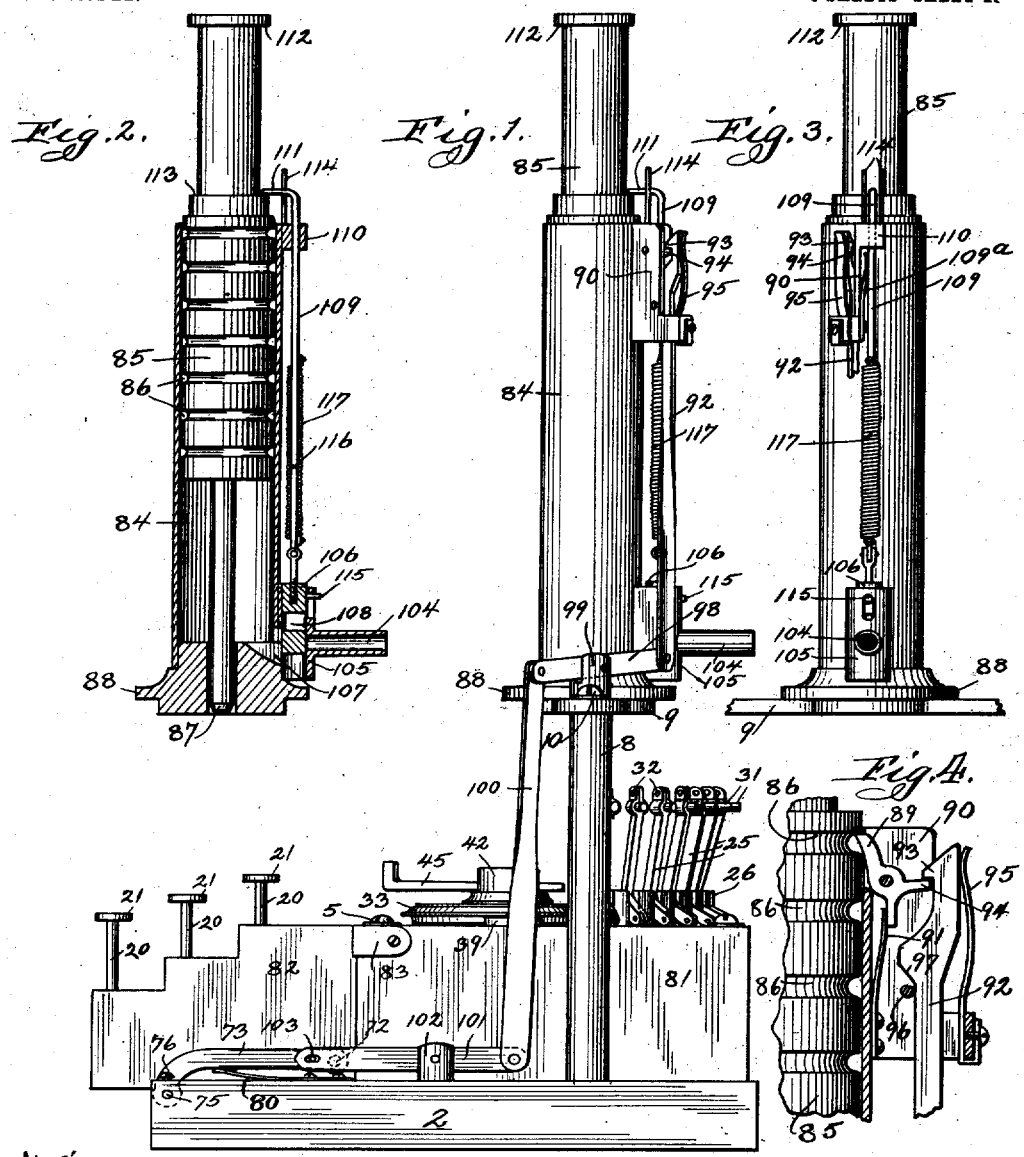
Witnesses:
R. J. Jacker
R. H. Burfiend
Inventor:
William Kaisling
by Robert Lewis Ames
Atty.

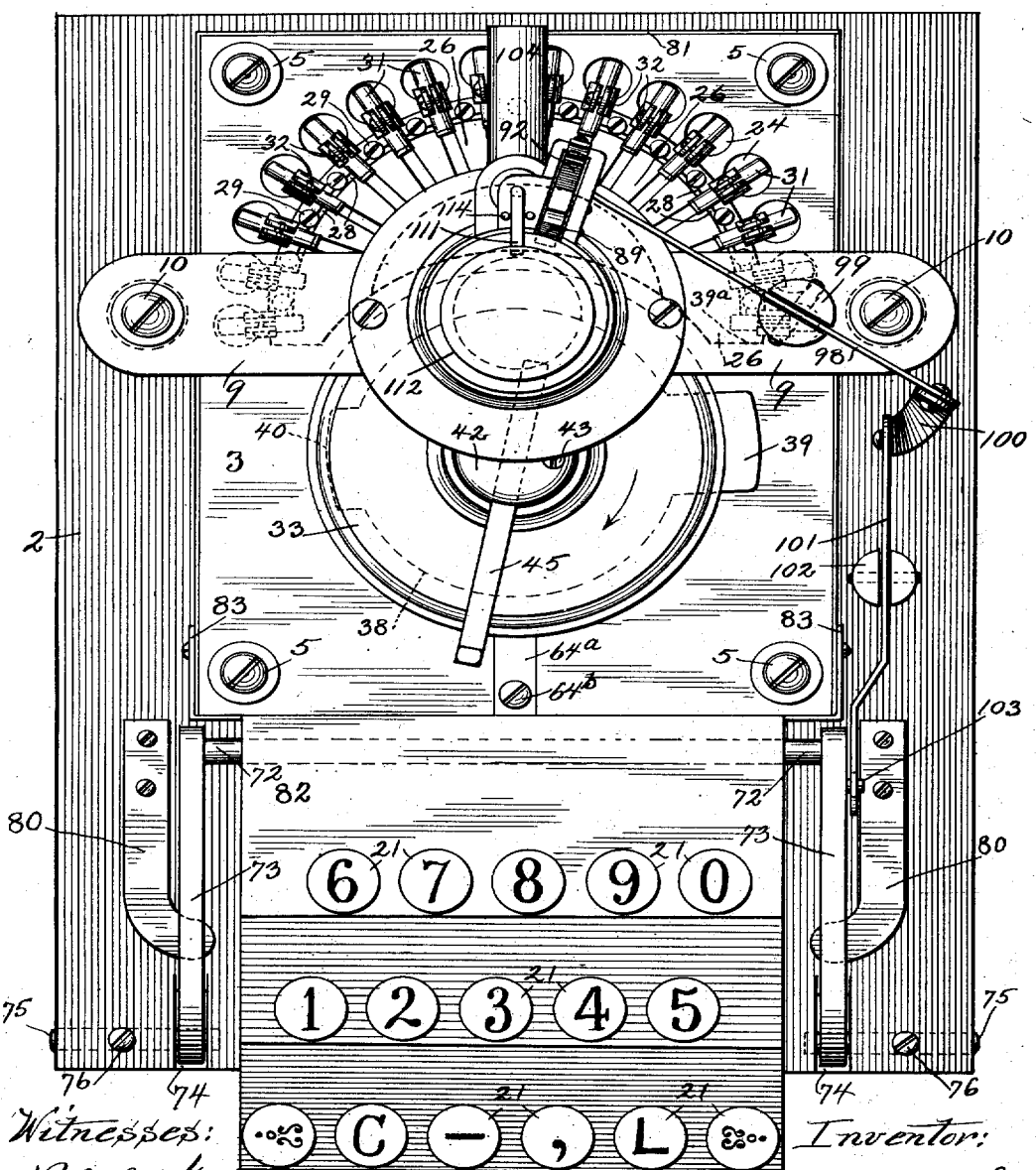

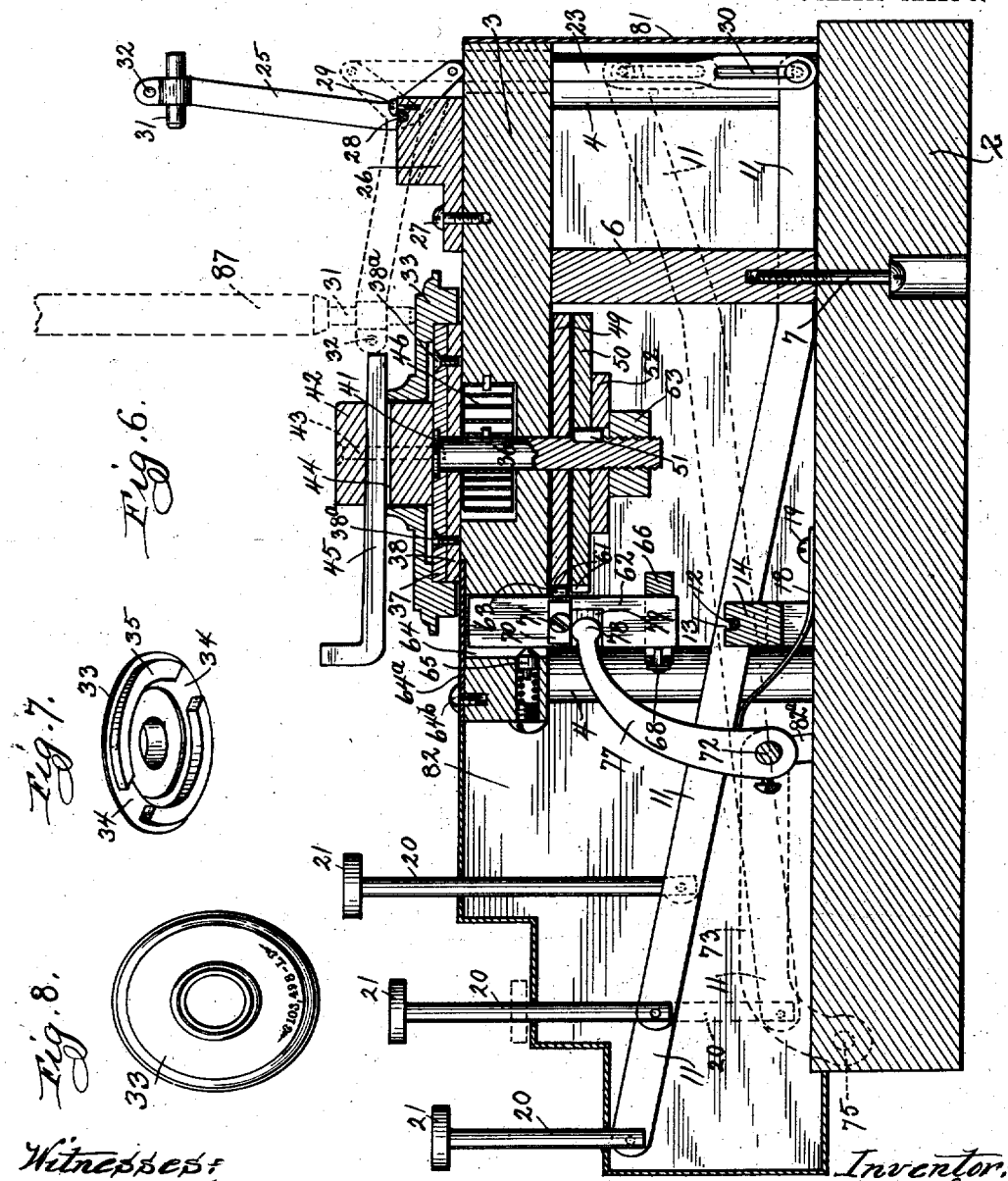

No. 756,649. PATENTED APR. 5, 1904.
W. KAISLING.
MACHINE FOR MARKING TRANSMITTER FRONTS OR THE LIKE.
APPLICATION FILED MAY 1, 1903.
NO MODEL. 6 SHEETS—SHEET 4.

Witnesses: Inventor: William Kaisling, By Robert Lewis Ames Atty.

No. 756,649. PATENTED APR. 5, 1904.
W. KAISLING.
MACHINE FOR MARKING TRANSMITTER FRONTS OR THE LIKE.
APPLICATION FILED MAY 1, 1903.
NO MODEL. 6 SHEETS—SHEET 5.
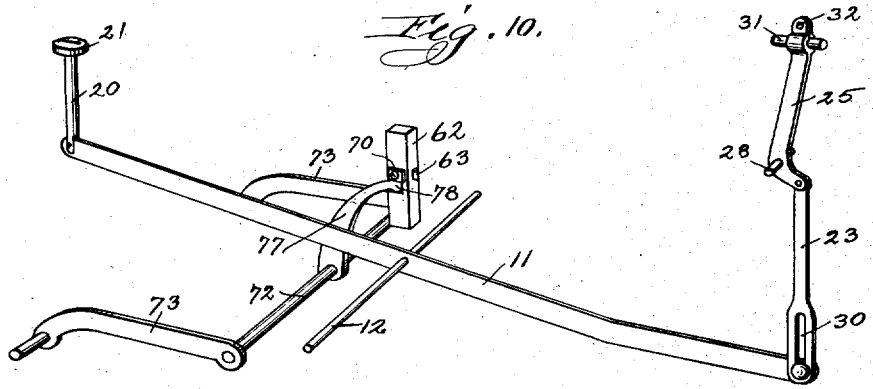
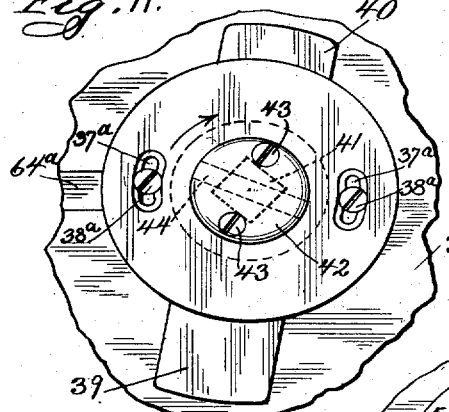
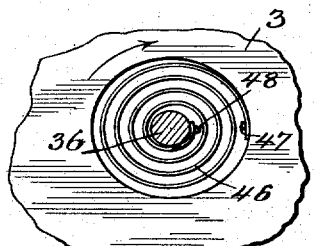
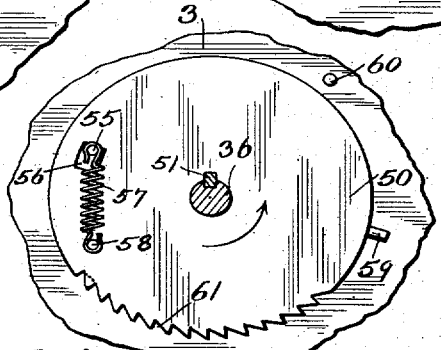
THE NORRIS PETERS CO., PHOTO-LITHO., WASHINGTON, D. C.

No. 756,649. PATENTED APR. 5, 1904.
W. KAISLING.
MACHINE FOR MARKING TRANSMITTER FRONTS OR THE LIKE.
APPLICATION FILED MAY 1, 1903.
NO MODEL. 6 SHEETS—SHEET 6.

Witnesses:
R. J. Jacker
R. H. Borfind

Inventor:
William Kaisling
By Robert Lewis Ames,
Atty.

No. 756,649. Patented April 5, 1904.

UNITED STATES PATENT OFFICE.

WILLIAM KAISLING, OF CHICAGO, ILLINOIS, ASSIGNOR TO KELLOGG SWITCHBOARD & SUPPLY COMPANY, OF CHICAGO, ILLINOIS, A CORPORATION OF ILLINOIS.

MACHINE FOR MARKING TRANSMITTER-FRONTS OR THE LIKE.

SPECIFICATION forming part of Letters Patent No. 756,649, dated April 5, 1904.

Application filed May 1, 1903. Serial No. 155,120. (No model.)

*To all whom it may concern:*

Be it known that I, WILLIAM KAISLING, a citizen of the United States of America, and a resident of Chicago, county of Cook, and State of Illinois, have invented a new and useful Improvement in Machines for Marking Transmitter-Fronts or the Like, of which the following is a specification.

My invention relates in general to machines for stamping or impressing characters upon metallic or analogous parts, but more particularly to machines for stamping characters upon the front pieces of telephone-transmitters.

It is often desired to number consecutively certain manufactured parts—as, for instance, the front pieces of telephone-transmitters—as well as to stamp other matter upon the same, and heretofore it has been common to do such work by hand.

My invention is designed to supersede such hand methods; and it consists in the provision of a machine by which the desired characters may be printed with rapidity and convenience upon the said parts.

In carrying out my invention I provide a plurality of type-carrying levers or bars and operating-keys therefor located upon a suitable keyboard, a feeding mechanism by which the article to be marked is suitably held and carried into printing position, and a power mechanism, preferably in the form of a drop-hammer, by which the type carried by the said levers or bars when brought into printing position are caused to make the impressions in the article to be marked. By this machine the articles may be stamped or marked in a more uniform manner than by the old hand methods and with much greater rapidity.

My invention is illustrated by the aid of the accompanying drawings, in which the same reference characters are used throughout the several views to designate like parts, and in which—

Figure 15:
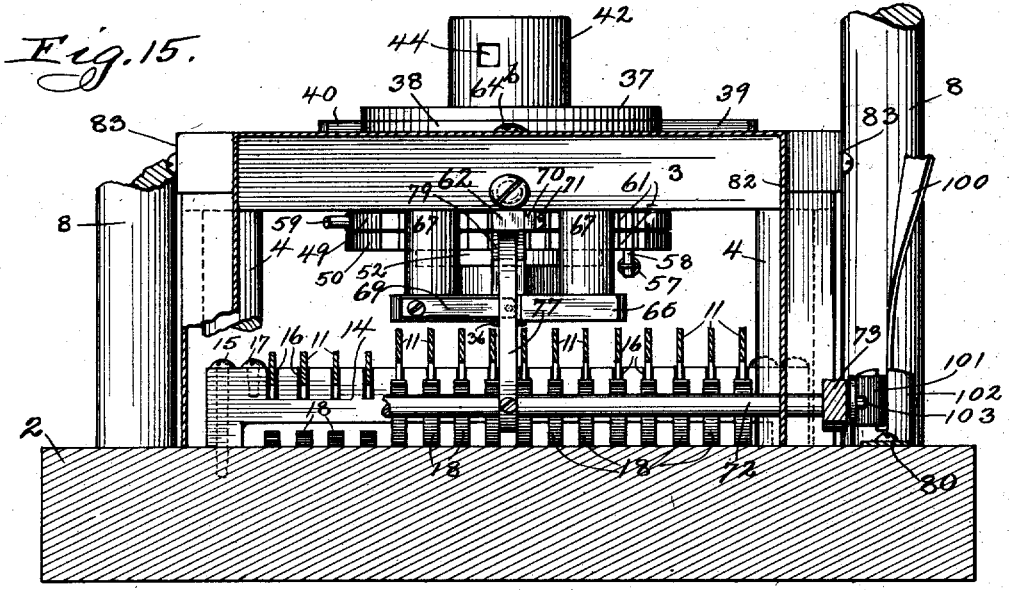
Figures 16, 17:
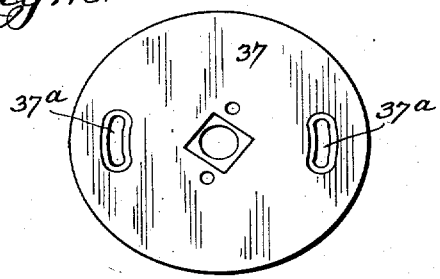
Figure 18:
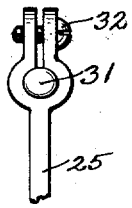
Figure 19:
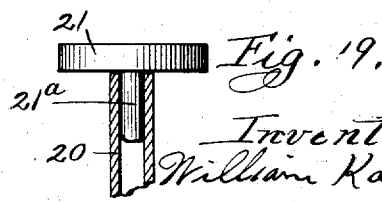

Figure 1 is a side elevation of the machine. Fig. 2 is a vertical section through the drop-hammer mechanism. Fig. 3 is a side elevation of the drop-hammer mechanism looking toward the side of the valve and stop mechanism. Fig. 4 is a section through the pawl mechanism by which the hammer is held in raised position. Fig. 5 is a plan view of the machine. Fig. 6 is a vertical longitudinal section of the lower part of the machine, showing particularly the key-lever and type-bar mechanism, together with the escapement mechanism. Fig. 7 is a perspective view of the inner face of a transmitter-front such as this particular machine is designed to stamp. Fig. 8 is a view of the outer face thereof and showing the matter that has been stamped thereon. Fig. 9 is a sectional plan view of the machine, taken just beneath the plate 3 and showing the arrangement of the escapement mechanism and the key-levers. Fig. 10 is a perspective view of the key and type levers, as well as the escapement-pawl and its operating parts. Fig. 11 is a plan view of the feeding device. Fig. 12 is a detail view of the spring for operating the feeding device. Fig. 13 is a view of the lower side of the escapement-disks. Fig. 14 is an edge view of said disks. Fig. 15 is a transverse vertical section taken in the rear of the keyboard and with parts broken away to clearly show the key-lever pivot-support. Fig. 16 is a detailed view of the upper feed-plate. Fig. 17 is a detailed view of the lower feed-plate. Fig. 18 is a detailed view of the means for securing the type-chisels in the ends of the type-bars, and Fig. 19 is a detailed view of the keys.

The machine includes a key-lever mechanism for operating the type-bars, a feeding mechanism for feeding the article to be worked upon into position to receive the impressions of the type carried by the type-bars, and a power device in the form of a drop-hammer mechanism which causes the type when in position to make the impression in the article to be stamped. These various mechanisms are all mounted upon a framework comprising a heavy rectangular base 2, as shown in Figs. 1, 5, 6, 9, and 15, preferably of cast-iron, upon which is mounted, toward the rear thereof, a metal plate 3, also rectangular in form and of considerable thickness, as shown in Figs. 5 and 6, and which is supported at some little distance above the said base 2 by the posts 4, placed at each corner of the plate 3 (see Fig. 9) and secured in position at their upper ends by the machine-screws 5, Fig. 5, passing through the plate 3 and into the posts, and at their lower ends to the base 2, preferably in the manner shown in connection with the additional post 6, (see Fig. 6,) which is provided, as hereinafter explained, to receive the shock of the drop-hammer and is secured to the base 2 by the countersunk screw 7, inserted from the bottom side of the base 2 into the lower end of the said post. At the sides of the plate 3 and toward the rear of the machine other posts 8 are secured at their lower ends to the base 2 in any desired manner and at their upper ends carry a yoke 9, secured thereto by suitable screws 10, upon which the drop-hammer mechanism of the machine is mounted. The framework thus described serves to carry the various mechanisms of the invention, which will now be described.

*The key-lever and type-bar mechanism.*—The key-levers consist of metal strips 11, as shown in Figs. 6, 9, 10, and 15, pivoted on a rod 12, that is supported in a groove 13, formed in the upper side of the pivot-bar 14, extending transversely across the base 2, to which it is secured by the screws 15. Notches 16 are provided in the upper side of this bar for the key-levers 11 to freely vibrate in, and the pivot-bar 12 is secured in place by the overlapping heads of the screws 17, inserted in said bar at the end of the rod. A lifting-spring 18 is provided for each key-lever 11 and is secured by a screw 19 to the base 2 and has its free forward end bent upwardly to engage the under edge of the lever 11. These springs serve to lift the forward ends of the key-levers 11 when undepressed. These key-levers extend toward the rear of the machine to the desired distance and are parallel with each other throughout their forward portion; but at the rear they are fanned out, as it were, to reach the desired points. At their forward ends the upwardly-extending hollow key-shanks 20 are pivoted thereto and carry at their upper ends the keys 21. These keys, as shown in Fig. 5, are arranged in transverse rows, and the rows are of different heights above the base or stepped in a manner similar to the ordinary type-writer keyboard, the said shanks 20 being held in upright position and guided by the forward portion of the casing 82 of the machine, as hereinafter explained. The keys 21 are provided upon their upper faces with characters corresponding to the type that it is desired to employ in the machine, and in order that the same may be readily changed, as well as for the purpose of removing the casing 82, as later explained, I prefer to employ the construction shown in Fig. 19, in which it is seen that the key 21 is provided with a depending projection 21ª, adapted to be slipped in the upper end of the hollow shank 20, and by which arrangement the key may be readily removed from the said shank.

The rear ends of the key-levers 11 are, as stated, bent to one side or the other and are of the desired length to correspond to the position of the type-bars above, as shown in Fig. 9. At their rear ends are pivoted the upright links 23, which pass through suitable apertures 24 in the plate 3 and are pivoted at their upper ends to the short arms of the type-bars 25, which are in turn pivoted in suitable notches formed in the semicircular block 26, mounted upon the upper side of said plate 3 and secured in position by screws 27. Each type-bar is provided with a separate pivot 28, secured in suitable grooves in the upper side of said bar 26 and held in place by screws 29. As shown more clearly in Fig. 5, these type-bars are arranged in semicircular order upon the plate 3 and when depressed their free ends are adapted to be brought to the same printing position. Owing to the different lengths of the key-levers 11 upon both sides of their pivots, which is necessitated by the arrangement of the machine, the lower ends of some of the links 23 are provided with slots 30 of varying lengths, so that the proper movement of the key-levers, which also control the feeding mechanism and the drop-hammer, may be obtained.

The normal position of the keys and type-bars is indicated in full lines in Fig. 6, while the depressed position is indicated in the dotted lines. Pressure upon the key 21 forces the forward end of the corresponding lever down, thus causing the rear end of the lever to lift the link 23, and thereby bring the upper end of the type-bar 25 into the printing position. When pressure is removed from the key, the spring 18 lifts the same and restores the key-lever and type-bar to normal position.

In the end of the longer arm of each type-bar 25 is carried a suitable type-punch 31, the shank or body of which is clamped by the spring members at the end of the type-bar, forced together by the clamping-screw 32, as clearly shown in Fig. 18. These type-punches are preferably of steel or are steel-faced, and the characters are in relief on the face in the form of cutting edges similar to a cold-chisel, so that an impression may be made in a metal or other article. This opposite end of the type-block is formed to receive a blow, which in the particular arrangement of this machine is arranged to be delivered by a drop-hammer. This is indicated in dotted lines in Fig. 6, wherein the type-bar is shown depressed by the action of the key 21, the type-punch 31 thereby brought into printing position, and the hammer 87 striking the foot or end of the type body or shank 31 to cause the character upon the fall of the type-punch to make an impression in the article 33.

It will be understood that other kinds of type may be employed for other classes of work, and other arrangements may be utilized for causing it to make the desired impression in the article to be marked. The general arrangement of the key-lever and type-bar mechanism is shown in Fig. 10. Each type by the operation of the corresponding key is adapted to be brought into the same printing position beneath the drop-hammer 87.

*The feeding mechanism.*—The article that the present machine is designed to stamp is the front piece of a telephone-transmitter of the type shown in Figs. 7 and 8, Fig. 7 showing the lower side of the transmitter-front 33, in which notches 34 are formed in the raised rib 35, said notches being designed to accommodate the ends of the bridge-piece of the transmitter, as is well understood, and Fig. 8 illustrating the outer face of the transmitter-front, on which are stamped the desired characters. The feeding mechanism of the machine is therefore designed to receive articles of this particular form and to suitably carry them into proper position to be marked; but it will be understood that this mechanism, like other parts of the machine, may be readily adapted to the requirements of other articles and other forms that it may be desired to stamp or mark. In this mechanism, as seen in Figs. 6 and 9, a bolt, shaft, or spindle 36 passes through a suitable aperture in the plate 3 and carries at its upper end the disks 37 and 38, the lower disk 38 (see Figs. 5, 11, and 17) being provided with the projections 40 and 39, extending beyond the periphery of the upper disk 37, and are adapted to fit into the notches 34 of the transmitter-front, as shown in Figs. 5 and 6, when the front piece is placed upon the said disks. The upper end of the shaft 36 is provided with a squared end 41, which fits a corresponding aperture in the disk 37, as shown in Fig. 16, which causes said shaft or bolt and the said upper feed-disk to rotate together. The lower disk is adjustably secured to the upper by means of the screws 38$^a$ passing through slots 37$^a$ in the upper disk and threading into suitable apertures in the lower. The projection 39 of the lower disk 38 serves also as a stop for the beginning of the stamping operation, as later explained, by striking against the end 39$^a$ (see Fig. 5) of the casting 26, in which the type-bars are pivoted. This adjustment between plates 37 and 38 therefore permits adjusting the upper plate, and consequently the article to be marked. A cylindrical projection 42 is mounted on the upper side of said disk and is secured thereto by the screws 43, which thread into the upper disk 37. The squared head or bolt 36 is thus held firmly seated. The projection 42 extends through the central aperture of the transmitter-front, which it approximately fits to better serve as a guide for the transmitter-front, and a transverse hole 44 through the same permits the insertion of a tapered key 45 above the central raised ring of the front piece to clamp it in position to be fed forward for marking. With this arrangement it is apparent that when the shaft 36 is rotated the transmitter-front must be rotated therewith and carried into printing position.

In a recess formed in the upper side of the plate 3 and surrounding the bolt 36 a spiral leaf-spring 46 is mounted, as shown in Figs. 6 and 12, and has one end secured to the wall of the recess, as at 47, while the other is secured to the shaft 36, as at 48. This spring is placed under tension and is designed, when permitted, to rotate the disks 37 and 38 in the direction of the arrows shown in the several figures.

Upon the lower side of plate 3 the escapement-disks 49 and 50 of the feeding mechanism are mounted upon the lower end of the said shaft 36, the upper disk being free to rotate independently of said shaft, while the lower disk is secured to rotate therewith by means of a suitable key 51. A washer 52 is placed beneath said disk 50 and is likewise secured in position by the key 51, and a nut 53 is then placed upon the lower end of the shaft 36, a set-screw 54 being passed through the nut 53 to prevent said nut from loosening. Referring to Figs. 13 and 14, a pin 55 projects from the upper escapement-disk 49 through a suitable slot 56 in the lower disk 50, and a coil-spring 57 extends from the projecting end of said pin 55 to pin 58, mounted upon said lower disk. The tension of this tends to draw the pins 55 and 58 together, but is of such strength as to be overcome by the superior strength of the spiral spring 46, mounted in the recess in the plate 3. A suitable projection 59, mounted upon the disk 49, is adapted to engage a stop-pin 60, secured to the lower side of the plate 3, when the said escapement-disks reach the desired limit of their movement. These escapement-disks are provided with ratchet-teeth 61 at a portion of their peripheries toward their forward edges, and a vertically-sliding block 62, as illustrated in Figs. 6, 9, and 15, is arranged in front of the said toothed portion of the disks and carries a ratchet pawl or tooth 63 of the proper size to coöperate with said ratchet-teeth 61 and being of substantially the same width as one of the said disks. The upper end of the block 62 is mounted in a suitable aperture 64 in the plate 3 and is pressed toward the rear edge of said slot by means of a spring-pressed pin 65, while the lower end of said block 62 is adapted to slide in a suitable aperture formed in a plate 66, that is supported at its ends by the rods 67, depending from the upper side of plate 3. The lower end of this block is likewise pressed toward the rear by the pin 68 at the free end of the leaf-spring 69, secured at its opposite end to the forward edge of the said plate 66. This clearance for the sliding block 63 permits the disks to be manually rotated back to the starting position, since the pawl or tooth 63 merely rides over the inclined faces of the teeth by pushing the block back against the force of the springs at its upper and lower ends. A stop-block 70 is secured by screw 71 to the side of block 62 to engage the lower side of plate 3 and limit the upward movement of said block. The aperture 64 in plate 3 is covered by a removable strip 64ª, normally held in place by a screw 64ᵇ.

Under normal conditions the spring 46 is placed under tension, as stated above, and tends to rotate the shaft 36 and the parts carried by it in the direction of the arrows. When the pawl 63 is in its uppermost position, as shown, the upper escapement-plate 49 is prevented from rotation by the tooth 63 and the lower plate 50 is moved by spring 46 against the tension of spring 57 until the pin 55, carried by said upper pin 49, engages the farther edge of the slot 56 in the lower plate, this position being shown in Fig. 13 and in dotted lines in Fig. 9. In this position the teeth in the upper and lower plates are in alinement, so that the pawl 63 may be depressed so as to engage the tooth in the lower plate 50 and to free the upper plate. When this is done, the lower plate 50 and the shaft 36 are held stationary; but the upper plate 49 is sprung forward by means of the coil-spring 57 until the pin 55 strikes the opposite edge of the slot 56. As the length of slot 56 corresponds to the distance between the teeth on the escapement-disks, the teeth are again in alinement, and when pawl 63 is again moved to its upper position it engages the tooth of the upper plate 49 to hold it stationary while the lower disk, together with shaft 36, the upper plates 37 and 38, and the transmitter-front 33 secured thereto are moved forward the space of one tooth or until the pin 55 strikes the end of the slot 56 in the lower plate. This operation is carried out as long as desired until the stop 59, carried by the upper disk, reaches the stop-pin 60, mounted upon the frame. In order to return the disks 37 and 38 to their first position in order to start the work, it is only necessary to rotate the same by means of key 45, the spring-pins 65 and 68 in front of the block 62 permitting the pawl 63 to ride over the rotating teeth of the disks. The stopping of the disks at starting position may be determined in any suitable way; but for the purposes of this particular machine I prefer to stop the same by permitting the projection 39 to engage the corner 39ª of the semicircular block 26, in which the type-bars are pivoted. (See Fig. 5.) In order to actuate the said slidable pawl-block 62 through the medium of keys 21, I mount the rod 72 in the free ends of the pivot-arms 73 73, pivoted at their rear ends in suitable slots 74 74, formed in the upper face and near the front edge of the base 2. Suitable pivot-pins 75 75 extend from the edges of the base-plate through said slots and are secured in position by means of screws 76 76. This rod 72 passes beneath the forward portion of the key-levers 11 and is engaged and depressed by said key-levers when they are operated. At the center of the rod 72 a vertical arm 77 is mounted and curves rearwardly, so that its rounded end 78 projects into a suitable notch 79, formed in the front edge of said slidable block 62. When, therefore, one of the keys of the machine is depressed, the lever 11 engages the bar 72, which when depressed carries with it the arm 77 and lowers the block 62, so as to free the upper escapement-disk 49 and to engage the lower disk 50. In order that the escapement-pawl shall be raised when pressure is removed from the key, suitable springs 80 are secured at their rear ends to the face of the base 2 and at their forward ends are curved upwardly and inwardly beneath the pivoted arms 73 and serve to raise the bar 72 and the escapement-block 62. Thus it is seen that a depression of a key 21 serves to bring the type into printing position, while the article to be stamped remains stationary; but when the key is released the escapement moves the article one step forward.

A suitable sheet-iron casing 81 is placed around the side and rear edges of the plate 3 and reaching to the base 2, so as to inclose that portion of the machine, and a forward casing 82, also of thin sheet metal, is placed over the forward ends of the key-levers 11 and is secured to the rear portion of the casing by the overlapping lugs 83, Figs. 1 and 5, and suitable screws. The forward end of this latter portion of the casing is stepped, as shown in Figs. 1, 5, and 6, to accommodate the similarly-stepped rows of keys 21. Suitable slots 82ª accommodate the movement of rod 72. By means of this casing the lower part of the machine is entirely inclosed and protected, as shown in Fig. 1.

*The drop-hammer mechanism.*—This mechanism comprises a cylinder 84, in which the hammer reciprocates. The hammer is provided with a portion 85, adapted to closely fit the said cylinder and in which a plurality of grooves 86 are formed. The lower end of said hammer consists of the portion 87 of reduced diameter, which passes through the lower end 88 of the said cylinder and which is secured to the upper side of the yoke 9. When the hammer is in its lowermost position, the end of the part 87 strikes the upper end or foot of the type-punch 31, held in the end of one of the type-bars 25, as shown in dotted lines in Fig. 6. When the hammer is in its normal raised position, it is supported by the dog 89, Fig. 4, engaging the upper edge of the upper groove 86, said dog being pivoted in a support 90, secured to the upper end of the cylinder or tube 84, and a spring 91 engaging the said dog to press it toward the hammer. In order to release the said dog, a link 92 is provided at its upper end with a catch 93, adapted to engage the projection 94 of said pawl. A spring 95 tends to press the catch 93 toward the dog, while a pin 96, mounted in the block 99, engages a cam edge 97, formed upon the link 92 when the latter is depressed, said cam serving to move said catch 93 away from the projection 94 of the pawl 89, so as to release the same. The upper end of said link 92 is guided by the support 90. The lower end of said link is pivoted to one end of a lever 98, that is fulcrumed in a block 99, mounted upon the upper side of said yoke 9, and to the other end of which lever a second link 100 is pivoted and extends to a point adjacent the base 2, where it is in turn pivoted to the rear end of a short lever 101, that is fulcrumed in a block 102, carried by the base 2. The forward end of the link 101 is provided with a slot through which projects a pin 103, carried by the adjacent pivoted arm 73 of the escapement mechanism. It is thus apparent that when one of the keys of the machine is depressed this combination of levers and links serves to depress projection 94 of pawl 89 to free it from the groove 86 in the drop-hammer to thus release the said hammer to permit it to drop.

In order to lift the hammer automatically, I make use of pneumatic means which is controlled, as hereinafter explained, from the keyboard; but it will be understood that other means may be employed to lift the hammer without departing from the broad scope of my invention. To this end a pipe 104 (see particularly Fig. 2) is connected with any suitable source of air-pressure and connects through a suitable valve-chamber 105 with the interior of the cylinder 84 beneath the part 85 of the hammer. A suitable slide-valve 106 is placed in said valve-chamber and serves in its raised position to open an exhaust-passage 107 from said cylinder to the atmosphere and in its depressed position to close said exhaust and to open a passage from tube 104 through its port 108 to the interior of said cylinder. This compressed air will then serve to lift the hammer, the portion 85 serving as a piston for the cylinder and the oil gathering in the grooves 86 serving as a packing for the piston. For the purpose of suitably operating the said valve 106 a valve-rod 109 extends therefrom to and through a suitable guide 110 on the said support 90 at the upper end of the cylinder. The upper end 111 of the said rod is bent at right angles and projects into the reduced portion of the upper end thereof between the shoulders 112 and 113. These grooves and shoulders preferably extend entirely around the hammer, which not only aids in the manufacture of the hammer, but it also permits the hammer to turn in any desired manner in the cylinder 84 without affecting the coöperating mechanism. A friction-spring 109$^a$ bears against valve-rod 109 to prevent it from falling by gravity when the hammer falls. When the hammer is raised, therefore, the said shoulder 113 at the end of its travel strikes the end 111 of said rod 109 and lifts the valve 106 to close the air-inlet and open the exhaust. The hammer is thus stopped and is caught in its upper position by the dog 89 engaging in the upper groove 86, and when the hammer drops the shoulder 112 at the lower end of its movement strikes the said end 111 of the valve-rod and shifts the valve to its lower position, which closes the exhaust and opens the air-inlet to the cylinder, and the hammer is again raised by the pressure of the air. Suitable guides 114 are provided for the said end 111, and a suitable guide-pin 115 is provided for the valve 106. To prevent injury to the mechanism by a too extended movement of the upper end of the valve-rod by the hammer, said rod is preferably severed at the point 116 and a coil-spring 117 is slipped over the two ends of the rod and secured thereto, as shown in Fig. 2. A suitable stop may be secured to the cylinder to prevent the hammer being thrown out of the end thereof, or the air-pressure may be regulated to the required degree. The object of the cam 97 and pin 96 is to quickly free the dog 94, so that no matter how quickly the hammer is lifted the said dog 89 will be free to engage and hold the same in its lifted position, for it is apparent that no ordinary operator would release the key 21 soon enough to permit the dog 89 to catch the hammer if the link 92 were permanently connected to the said dog.

It is believed that the construction and operation of the machine shown in the drawings has now been made clear. It is also to be noted that in case it was desired to mark articles in a straight line or in other way, that a straight escapement or a suitable escapement instead of the circular escapement could be provided. It is also apparent that other means than air-pressure could be employed to lift the hammer and that other mechanism in place of the drop-hammer mechanism might be employed to cause the type to make the impressions. I do not, therefore, wish to be limited in all respects and in all claims to the particular mechanism shown and described; but,

Having thus described my invention, what I claim, and desire to secure by Letters Patent, is—

1. In a machine for forming characters in metallic or analogous articles, the combination with a plurality of type, of mechanism controlled from a keyboard for moving said type into operating position, and power mechanism for causing said type to make an impression in the article to be marked, said power mechanism consisting of a freely-reciprocable hammer and means operable independently of the type-positioning devices for returning the hammer after each stroke, substantially as described.

2. In a machine for forming characters in metallic or analogous articles, the combination with a plurality of type-bars, type carried by said bars, a keyboard, mechanism between the keyboard and type-bars to move said type into operating position, and power mechanism to cause the type when brought into operating position to make an impression in the article to be marked, said power mechanism consisting of a freely-reciprocable hammer and means operable independently of the type-positioning devices for returning the hammer after each stroke, substantially as described.

3. In a machine for forming characters in metallic or analogous articles, the combination with a plurality of type-levers, type carried by said levers, a keyboard having keys thereon, key-lever mechanism extending between said keys and the type-levers whereby upon the operation of the keys the type carried by said type-levers will be brought into printing position, and power mechanism to operate upon said type to cause the same to make an impression in the article to be marked, said power mechanism consisting of a freely-reciprocable hammer and means operable independently of the type-positioning devices for returning the hammer after each stroke, substantially as described.

4. In a machine for forming characters in metallic or analogous articles, the combination with a feeding mechanism adapted to carry the article to be marked, of a plurality of type, a keyboard, mechanism controlled by the keyboard for successively bringing said type into printing position and for moving said article step by step into position to be marked, and power mechanism for causing said type to make an impression in the said article to be marked, said power mechanism consisting of a freely-reciprocable hammer and means operable independently of the type-positioning devices for returning the hammer after each stroke, substantially as described.

5. In a machine for forming characters in metallic or analogous articles, the combination with a plurality of type, of mechanism controlled from a keyboard for moving said type into operating position, and power mechanism also controlled by said keyboard to cause said type to make an impression in the article to be marked, said power mechanism consisting of a freely-reciprocable hammer and means operable independently of the type-positioning devices for returning the hammer after each stroke, substantially as described.

6. In a machine for forming characters in metallic or analogous articles, the combination with a plurality of type, of mechanism, for bringing said type into printing position, a freely-descendible drop-hammer to operate upon said type when in printing position to cause an impression in the article to be marked, and means for raising said hammer independently of the type-positioning devices, substantially as described.

7. In a machine for forming characters in metallic or analogous articles, the combination with a plurality of type, of mechanism controlled from a keyboard for moving said type into printing position, a freely-descendible drop-hammer also controlled from said keyboard to operate upon said type to make an impression in the article to be marked, and power means for raising said hammer after each working stroke, these means being operated by the descent of the hammer, substantially as described.

8. In a machine for forming characters in metallic or analogous articles, the combination with a plurality of type, of mechanism controlled from a keyboard for moving said type into printing position, a feeding mechanism controlled from the keyboard for moving said article into printing position, and a freely-descendible drop-hammer also controlled from the keyboard for causing said type to make an impression in the said article when brought into the printing position, and power means for raising said hammer after each stroke, these means being controlled by the movement of the hammer, substantially as described.

9. In a machine for forming characters in metallic or analogous articles, the combination with a plurality of type, mechanism for bringing the said type into printing position, a freely-descendible drop-hammer to operate upon said type when brought into printing position to cause it to make an impression in the article to be marked, and means for automatically raising said hammer after the impression has been made, these means being operable and controllable independently of the type-position devices, substantially as described.

10. In a machine for forming characters in metallic or analogous articles, the combination with a plurality of type, of mechanism controlled from a keyboard for moving the type into operating position, a drop-hammer automatically released by the operation of the keyboard to cause said type to make an impression in the article to be marked when brought into printing position, and auxiliary means independent of the type-positioning devices and controlled by the drop of the hammer, to return said hammer to normal position after the blow has been delivered, substantially as described.

11. In a machine for forming characters in metallic or analogous articles, the combination with a plurality of type, of mechanism controlled from the keyboard for bringing said type into printing position, a drop-hammer to strike said type to cause it to make an impression in the article to be marked, and pneumatic means actuated by the descent of the hammer, for returning the hammer to normal position after the type has been struck, substantially as described.

12. In a machine of the class described, the combination with means for holding an article, of type mechanism, means to bring the type into operative position, and further means to cause said type to make an impression in the article to be marked, said means consisting of a freely-reciprocable hammer, and means for returning it independently of the type-operating devices, substantially as described.

13. In a machine of the class described, the combination with means for holding an article and means for feeding the article, of type and means to bring the same into operative position, a drop-hammer to strike said type to cause it to make an impression in the article, means for returning the drop-hammer after each stroke, and means connected directly to the feed mechanism for tripping said drop-hammer.

14. In a machine of the class described, the combination with means for holding an article, of type and means to bring the type into operative position, a drop-hammer to strike the type when in operative position, means for tripping the hammer, and independent automatic means for returning the hammer, this means being put into operation by the act of the hammer in descending.

15. In a machine of the class described, the combination with means for holding an article of type, and means to bring the type into operative position, and power mechanism for striking the type when in position, said power mechanism consisting of a guide-cylinder, a freely-reciprocable hammer in said cylinder, means whereby the impact-stroke of the hammer is controlled from the type-positioning devices, and independent power means for returning the hammer after each impact-stroke.

16. In a machine of the class described, the combination with means for holding an article, of type and means to bring the same into operative position, an air-cylinder, a hammer freely slidable therein, means connected to the type-positioning devices for controlling the working stroke of the hammer, and a valve mechanism controlled by the movements of the hammer for admitting the air to and exhausting the air from said cylinder.

17. In a machine of the class described, the combination with means for holding an article, of type and means to bring the same into operative position, an upright cylinder, a freely-descendible hammer therein, a pawl for holding up the hammer, means connected to the type-positioning devices for tripping this pawl, and means for returning the hammer after each stroke.

18. In a machine of the class described, the combination with means for holding an article, of type and means to bring the same into operative position, an air-cylinder, a slidable hammer working therein, means controlled from the type-positioning devices for releasing said hammer, a valve controlling the admission and emission of air, a valve-rod connected to said valve, and means whereby said valve-rod is shifted as the hammer reciprocates.

19. In a machine of the class described, the combination of a base, a bed supported above the base, key-levers extending rearwardly between the bed and base, keys attached to the front ends of these levers, type-carrying bars supported upon the upper side of the bed at the rear of the machine and connected to the rear ends of the key-levers, means for holding the article located on the bed between the keys and the type-bars, a power-hammer, and means for raising said hammer after each stroke, these means being controlled by the movement of the hammer, substantially as described.

20. In a machine of the class described, the combination of a base, a bed supported thereover, key-levers extending rearwardly between the bed and the base and carrying keys at their forward ends, type-carrying levers pivotally supported on the bed at the rear end of the same and adapted to swing forward and downward, means connecting these type-levers with the key-levers, a power-hammer, power means for raising said hammer after each stroke, these means being controlled by the movement of the hammer and article-holding means supported on the bed in front of the type-levers, substantially as described.

21. In a machine of the class described, the combination of a base, a bed supported thereover, type-levers supported on the upper side of the bed at its rear end, key-levers, provided at their forward ends with keys and extending rearward under the bed, means connecting these levers with the type-levers, article-holding means supported on the bed in front of the type-levers, article-feeding means located under the bed and connected to the article-holder, and means for operating this feed means from the key-levers, a power-hammer, and power means for raising said hammer after each stroke, these means being controlled by the movement of the hammer, substantially as described.

22. In a machine of the class described, the combination of a frame, a series of key-levers carrying keys, type-carrying levers connected to said key-levers, an article-holding device and feed mechanism connected to said device and consisting essentially of a spring-actuated shaft, a pair of ratchet-wheels on said shaft, one wheel being secured to the shaft and one being loose thereon, means for resiliently connecting these ratchet-wheels together, a pawl device adapted to be shifted from one wheel to the other alternately, and means for shifting this pawl from the key-levers, a drop-hammer, means for raising said hammer, and means connected directly to the feed mechanism for tripping said drop-hammer, for the purposes set forth.

Signed by me at Chicago, county of Cook, State of Illinois, this 29th day of April, 1903.

WILLIAM KAISLING.

Witnesses:
GAZELLE BEDER,
I. W. STIGER.

---

Correction in Letters Patent No. 756,649.

It is hereby certified that in Letters Patent No. 756,649, granted April 5, 1904, upon the application of William Kaisling, of Chicago, Illinois, for an improvement in "Machines for Marking Transmitter-Fronts or the like," an error appears in the printed specification requiring correction, as follows: In line 124, page 3, the word "upper" should read *lower;* and that the said Letters Patent should be read with this correction therein that the same may conform to the record of the case in the Patent Office.

Signed and sealed this 26th day of April, A. D., 1904.

[SEAL.]

F. I. ALLEN,
*Commissioner of Patents.* one wheel being secured to the shaft and one being loose thereon, means for resiliently connecting these ratchet-wheels together, a pawl device adapted to be shifted from one wheel to the other alternately, and means for shifting this pawl from the key-levers, a drop-hammer, means for raising said hammer, and means connected directly to the feed mechanism for tripping said drop-hammer, for the purposes set forth.

Signed by me at Chicago, county of Cook, State of Illinois, this 29th day of April, 1903.

WILLIAM KAISLING.

Witnesses:
GAZELLE BEDER,
I. W. STIGER.

Correction in Letters Patent No. 756,649

It is hereby certified that in Letters Patent No. 756,649, granted April 5, 1904, upon the application of William Kaisling, of Chicago, Illinois, for an improvement in "Machines for Marking Transmitter-Fronts or the like," an error appears in the printed specification requiring correction, as follows: In line 124, page 3, the word "upper" should read *lower;* and that the said Letters Patent should be read with this correction therein that the same may conform to the record of the case in the Patent Office.

Signed and sealed this 26th day of April, A. D., 1904.

[SEAL.]

F. I. ALLEN,
*Commissioner of Patents.*

It is hereby certified that in Letters Patent No. 756,649, granted April 5, 1904, upon the application of William Kaisling, of Chicago, Illinois, for an improvement in "Machines for Marking Transmitter-Fronts or the like," an error appears in the printed specification requiring correction, as follows: In line 124, page 3, the word "upper" should read *lower;* and that the said Letters Patent should be read with this correction therein that the same may conform to the record of the case in the Patent Office.

Signed and sealed this 26th day of April, A. D., 1904.

[SEAL.]

F. I. ALLEN,
*Commissioner of Patents.*